United States Patent

Sasaki et al.

[11] Patent Number: 5,888,171
[45] Date of Patent: Mar. 30, 1999

[54] HYDRAULIC PRESSURE AS A FUNCTION OF FRICTION COEFFICIENT IN CONTROL SYSTEM FOR AUTOMATIC TRANSMISSION

[75] Inventors: Kazuo Sasaki, Hiroshima; Minoru Kuriyama, Higashihiroshima, both of Japan

[73] Assignee: Mazda Motor Corporation, Hiroshima-ken, Japan

[21] Appl. No.: 810,738

[22] Filed: Jan. 31, 1997

Related U.S. Application Data

[63] Continuation of Ser. No. 509,004, Jul. 28, 1995, abandoned.

[30] Foreign Application Priority Data

Aug. 1, 1994 [JP] Japan .................................. 6-179928

[51] Int. Cl.$^6$ ...................................................... F16H 61/04
[52] U.S. Cl. ............................................ 477/156; 477/158
[58] Field of Search ..................................... 477/143, 156, 477/158

[56] References Cited

U.S. PATENT DOCUMENTS

4,584,905  4/1986  Eschrich et al. ......................... 477/155
5,505,675  4/1996  Kuriyama et al. ................... 477/158 X

FOREIGN PATENT DOCUMENTS

3249468  of 1991  Japan .

*Primary Examiner*—Khoi Q. Ta
*Attorney, Agent, or Firm*—Sixbey, Friedman, Leedom & Ferguson, PC; Gerald J. Ferguson, Jr.; Donald R. Studebaker

[57] ABSTRACT

A hydraulic control system for shifting an automatic transmission to desired gears by selectively coupling and uncoupling friction coupling elements which controls a shifting pressure necessary to bring a friction coupling element into coupling according to a presumed friction coefficient of the friction coupling element during shifting so as thereby to achieve an intended gear shift over an intended shifting time.

18 Claims, 11 Drawing Sheets

HYDRAULIC PRESSURE AS A FUNCTION OF FRICTION COEFFICIENT IN CONTROL SYSTEM FOR AUTOMATIC TRANSMISSION

This application is a Continuation of Ser. No. 08/509,004, filed Jul. 28, 1995, now abandoned.

BACKGROUND OF THE INVENTION

1. Field of the invention

The resent invention relates to a hydraulic control system for an automatic transmission.

2. Description of Related Art

Typically, automatic transmissions for automobiles comprise mechanical transmission devices or mechanisms and torque convertors. Available engine torque from a crankshaft is multiplied and transferred first by a torque convertor and subsequently by a mechanical transmission. Such a mechanical transmission includes a planetary gearset consisting of a sun gear, a ring gear and pinions which changes the path of power flow for gear shift. Specifically, in order for mechanical transmission to change gears or the path of power flow, the automatic transmission is provided with friction coupling elements, such as clutch mechanism for connecting and disconnecting the transmission of power to specific gears of the mechanical transmission and braking elements for braking specific gears of the mechanical transmission. These friction coupling elements and braking elements are selectively actuated by hydraulic control so as to perform gear shifts.

In the automatic transmission, if a shifting time which refers to a time necessary to complete a gear shift is too short, in other words, if the friction coupling element is abruptly actuated by high hydraulic pressure, the automatic transmission causes what is called "shift shock." Contrary, if the shifting time is too long, i.e. if the friction coupling element is slowly actuated by a high hydraulic pressure, there occurs a deterioration in the quality of driving. For that reason, in the hydraulic control of automatic transmission, the pressure of oil is typically controlled so as to complete gear shifts over specified shifting times according to driving conditions.

The shifting time is governed by torque transferred through a friction coupling element by which a specific gear shift is made and a coupling force of the friction coupling element, i.e. an oil pressure applied to the friction coupling element. Specifically, the greater the torque transferred through the friction coupling element, the longer the shifting time that a gear shift effected by the friction coupling element takes. On the other hand, with an increase in oil pressure, the shifting time becomes shorter. Consequently, controlling the oil pressure suitably in conformity with the torque transferred through the friction coupling element enables the automatic transmission to cause a specific gear shift achieved by the friction coupling element over a target or intended shifting time.

As it has been proved that a torque transferred through a friction coupling element related to a gear shift during shifting is a resultant force from a torque transferred to a transmission gear mechanism and an inertia caused by a change in rotational speed of a power transfer line to the transmission gear mechanism. That is, since a drop in rotational speed occurs to the turbine shaft of the torque convertor which is on the input side of the transmission gear mechanism, the power transfer line imparts to the friction coupling element the force of inertia in the same direction as torque of the turbine shaft during a shift-up and, on the other hand, in the direction opposite to torque of the turbine shaft during a shift-down. On that account, the hydraulic control system is adapted to control an oil pressure according to a torque transferred to the transmission gear mechanism and the force of inertia of the power transfer line to the transmission gear mechanism so as to enable the automatic transmission to cause a gear shift over a target shifting time. Hydraulic control systems of this kind are known from, for instance, Japanese Unexamined Patent Publications Nos. 3-249468 and 4-72099.

Experiments conducted by the inventors of this application led to the conclusion that hydraulic control systems of this kind are hard to cause the automatic transmission to achieve gear shifts over a target shifting time.

As shown in FIG. 11, the experimental results prove a comparatively adequate correlation which has a friction coefficient of correlation of 0.96011 between the inertia component pressure and angular deceleration $\omega'$. On the other hand, as shown in FIG. 11, the correlation between the torque component pressure and the input torque Tt has a coefficient of correlation of 0.788101, alluding that the torque component pressure is less correlated with the input torque Tt. According to the experimental results, there is a linear relation between the inertia component pressure Tci and angular deceleration $\omega'$. However, it is hard to say there is a linear relation between the torque component pressure and the input torque Tt. In FIG. 12, the measured values seem to be on a curve. If the equation (1) represents properly the correlations of line pressure with angular acceleration and a torque, they must have a coefficient of correlation of 1 (one) and all of the measured values must be exactly on straight lines in FIGS. 11 and 12.

It is apparent from the above discussion regarding the estimation of a target pressure P that the equation (I) is not always precise in order to estimate the target pressure P which is sufficiently accurate for achievement of a gear shift over an intended shifting time.

According to a conclusion derived by the considerations by inventors of this application, while the kinetic friction coefficient of a friction coupling element is considered to change according to an interfacial pressure or a relative speed between drive and driven members of the friction coupling elements, the prior art hydraulic control system is designed and configured on condition that the kinetic friction coefficient of a friction coupling element is constant and, consequently, produces changes in the target shifting time due to changes in the kinetic friction coefficient. In the light of the above considerations, it concluded that controlling the line pressure according to changes in the kinetic friction coefficients of friction coupling elements cause gear shifts achieved exactly over intended shifting times, respectively. Specifically describing, in the prior art hydraulic control system for an automatic transmission, a line pressure P, which in turn refers to a target shifting pressure, is regarded to be given by the following equation (I):

$$P = A\cdot\omega' + B\cdot Tt + C \qquad (I)$$

where $\omega'$ the angular acceleration, i.e. the force of inertia;

Tt is the torque transferred to the transmission gear mechanism; and

A, B and C are constants, respectively.

If the constants A, B and C can be known based on a plurality of measurements of these angular acceleration $\omega'$ and torque Tt and a line pressure at which the automatic transmission actually achieves a gear shift over an intended shifting time, a target pressure P is obtained for various angular acceleration ω' and torque Tt. Keeping the line pressure at the target pressure P forces the automatic transmission to achieve the gear shift over the intended shifting time.

The inventors made a survey of these factors for gear shifts achieved over the intended shifting time and a multiple regression analysis of 64 sets of angular acceleration ω', input torque Tt and line pressure P was done to determine the constants A, B and C which leads to minimum errors. According to the equation (I), a part of the whole hydraulic pressure corresponding to angular deceleration ω', which is referred to as an inertia component pressure, is proportional to angular deceleration ω'. Further, a part of the whole hydraulic pressure corresponding to an input torque Tt, which is referred to as a torque component pressure, is proportional to an input torque Tt. In other words, there must be a linear relation both between the inertia component pressure and angular deceleration ω' and between the torque component pressure and the input torque Tt. The experimental results which were obtained in the way described above are shown in FIGS. 11 and 12.

SUMMARY OF THE INVENTION

It is an object of the present invention to provide a hydraulic control system for an automatic transmission which achieves a desired gear shift accurately over an intended shifting time.

The above object of the present invention is accomplished by providing a hydraulic control system for an automatic transmission which includes hydraulically controlled friction coupling elements, such as comprising drive and driven plates, selectively coupled and uncoupled to change power transfer lines of the automatic transmission so as to shift the automatic transmission into desired gears. The hydraulic control system controls to develop the shifting pressure, which is necessary to bring the friction coupling element into coupling so as to cause a gear shift of the automatic transmission to a specific or desired gear, according to a friction coefficient of a friction coupling element presumed during a gear shift.

Specifically, the hydraulic control system presumes the friction coefficient based on at least one of an interfacial pressure and a relative speed between the drive and driven plates of the friction coupling element. The hydraulic control system further detects an input speed change in rotation (ω') of and an input torque (Tt) to the automatic transmission and determines the shifting pressure according to a function including these speed change and input torque as independent variables defined by a first order approximate functional equation, or alternatively according to a function including these speed change and input torque as independent variables defined by a second order approximate functional equation.

Practically, the shifting pressure P is given by the following first order approximate functional equation:

$$P = a_1 \cdot Tt + a_2 \cdot \omega' + a_3 \cdot Tt \cdot \omega' + a_4$$

or alternatively by the following second order approximate functional equation:

$$P = b_1 \cdot Tt + b_2 \cdot \omega' + b_3 \cdot Tt \cdot \omega' + b_4 Tt^2 + b_5 \cdot \omega'^2 + b_6 \cdot Tt^2 \cdot \omega' + b_7 \cdot Tt \cdot \omega'^2 + b_8 \cdot Tt^2 \cdot \omega'^2 + b_9$$

In these equations, $a_1$–$a_4$ and $b_1$–$b_9$ are constants depending upon a friction coefficient of the friction coupling element and determined experimentally and analytically.

With the hydraulic control system of the invention, because the shifting pressure is determined according to an input torque and a speed change in rotation of the automatic transmission and a presumed friction coefficient of a friction coupling element which includes drive and driven plates brought into friction coupling, it is accurately maintained at an optimum level for an intended shifting time even when there occurs a change in an actual friction coefficient. Together, the presumption of friction coefficient is made based on at least interfacial pressure and relative speed between the drive and driven plates of the friction coupling element, leading to more accurate shifting pressure control, i.e. a more accurate achievement of a gear shift over an intended shifting time.

In addition, the shifting pressure is given by the first order approximate functional polynomial or alternatively by the second order approximate functional polynomial, which includes an input torque and a speed change in rotation of the automatic transmission as independent variables. This results in a simplified logic of shifting pressure control.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
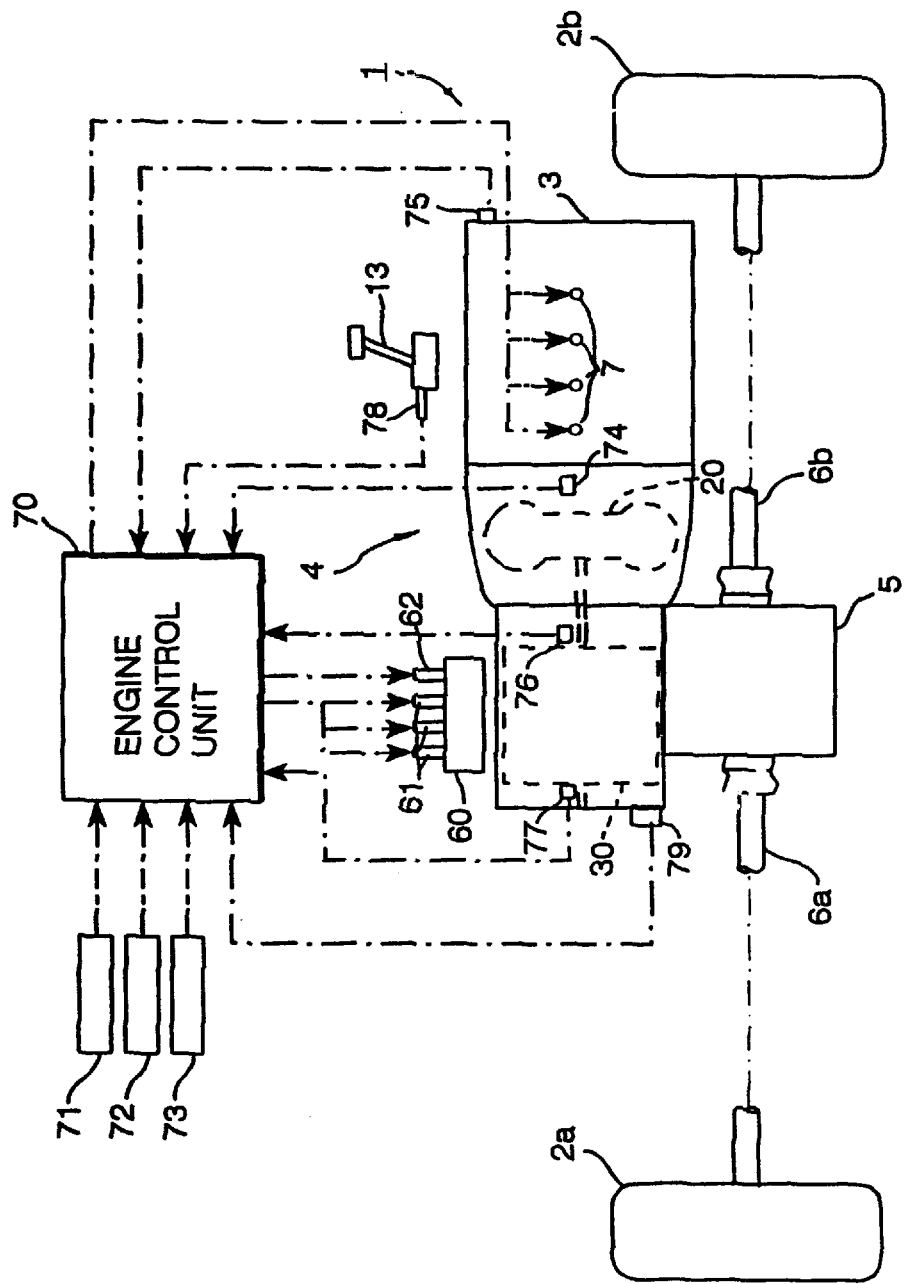
FIG. 1 is a schematic illustration of an automatic transmission equipped with a hydraulic control system in accordance with a preferred embodiment of the present invention.
Figure 2:
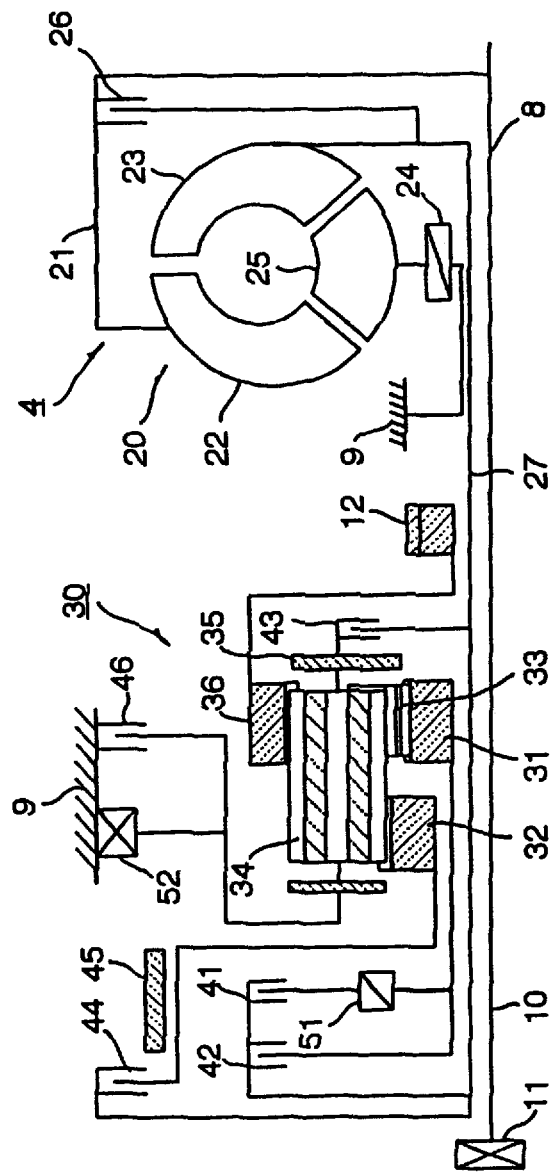
FIG. 2 is a skeleton diagram showing an automatic transmission.

Referring now to the drawings in detail, and in particular, to FIGS. 1 and 2, an automotive vehicle 1 shown as a type having a front engine 3 and front drive wheels 2a and 2b, is equipped with an automatic transmission 4 controlled by a hydraulic control system in accordance with a preferred embodiment of the present invention. Engine output torque is transferred to front drive wheels 2a and 2b through drive axles 6a and 6b, respectively, via the automatic transmission 4 and a differential 5. These engine 3 and automatic transmission 4 are consolidated in operation and controlled by a control unit (ECU) 70 which comprises a microcomputer and memories. For controlling the consolidated operation of the engine 4 and the automatic transmission 4, there are provided various sensors including a vehicle speed sensor 71, a throttle position sensor 72, an air flow sensor 73, an engine speed sensor 74, an engine temperature sensor 75, a turbine speed sensor 76, a transmission output speed sensor 77, a shift position sensor 78, an oil temperature sensor 79. The control unit 70 receives signals from these sensors 71–79 representative of related physical quantities and provides for various valves of a hydraulic control unit 60, which will be described later, including gear shift control solenoid valves 61 and a line pressure control duty solenoid valve 62, and ignition plugs 7 control signals, respectively. All these sensors 71–79 may take any type well known in the automobile art. In this instance, during a gear shift, a timing of ignition of the respective cylinder is controlled so as to reduce the engine output torque.

As shown in FIG. 2, the automatic transmission 4 cooperates with a torque convertor 20 disposed between and connecting the engine 3 and a transmission gear mechanism 30 so as to multiply and transfer the engine output torque to the transmission gear mechanism 30. The torque convertor 20, only schematically shown, consists of a pump 22 and a turbine 23, disposed face to face, and a stator 25, all of which are disposed in a casing 21. The pump 22 is secured to the casing 21 directly connected to an output shaft 8 of the engine 3. The turbine 23 has a hollow turbine shaft 27 which in turn transmits power from the torque convertor 20 to the transmission gear mechanism 30. The torque convertor 20 is equipped with a one-way clutch 24, connected between the stator 25 and a transmission housing 9, and a lock-up clutch 26 disposed between the convertor casing 21 and the turbine 23 for coupling directly the engine output shaft 8 and the turbine 23 together. A special lightweight oil is utilized to transmit the engine output torque from the pump 22 to the turbine 23. A shaft 10 passes through the hollow turbine shaft 27 so as to connecting the engine output shaft 8 to an oil pump 11 disposed on one end of the automatic transmission 4 remote from the engine 3.

The transmission gear mechanism 30 comprises a planetary gear set, which may be of, for instance, a Rabinyo type. The planetary gear set consists of a sun gear 31 having a small diameter (which is referred to as a small sun gear), a sun gear 32 having a diameter larger than the small sun gear 31 (which is referred to as a large sun gear), a carrier 35 carrying a plurality of short pinions 33 and a long pinion 34 for rotation, and a ring gear 36. The small sun gear 31 and the large sun gear 33, disposed axially behind the small sun gear 31, are fitted for rotation to the turbine shaft 27. The short pinions 33 are disposed at regular angular separations and between and in mesh with the front part of the long pinion 34 and small sun gear 31. The long pinion 34 is in mesh, on one hand, with the large sun gear 32 at its front part and, on the other hand, with the ring gear 36.

The automatic transmission 4 cooperates with various hydraulically controlled clutch element and brake elements which are selectively actuated so as to provide various drive ranges and forward and reverse gears or gear ratios, such as 1st–4th gears in a drive (D) range, 1st–3rd gears in a second speed (S) range, 1st and 2nd gear in a low speed (L) range, and a reverse (R) range in addition to park (P) and neutral (N) gears. These clutch element and brake elements are actuated by means of the hydraulic control unit 60.

The clutch and brake elements include hydraulically controlled, friction coupling or braking elements 41–46 and electromagnetically controlled one-way clutches 51 and 52.

A forward (FWD) clutch 41, which is one of the friction coupling elements, and a first (1ST) one way clutch 51 are disposed in series between the turbine shaft 27 and the small sun gear 31. Further, a coast (CST) clutch 42, which is one of the friction coupling elements, is disposed in parallel with respect to these forward clutch 41 and first one way clutch 51 between the turbine shaft 27 and the small sun gear 31. A 3–4 clutch 43, which is one of the friction coupling elements, is disposed between the turbine shaft 27 and the carrier 35. A reverse (RVS) clutch 44, which is one of the friction coupling elements, is disposed between the turbine shaft and the large sun gear 32. A 2–4 brake 45 of a type having a brake band, which is one of the friction braking elements, is disposed between the large sun gear 32 and the reverse clutch 44. Further, a low reverse (LRV) brake 46, which is another one of the friction braking elements, is disposed between the carrier 35 and the transmission housing 9. In parallel with the low reverse brake 46 there is disposed a second (2ND) one way clutch 52 between the carrier 35 and the transmission housing 9 which counters reaction from the carrier 35. The transmission gear mechanism 30 further includes an output gear 12 connected to the ring gear 36 through which it transmits the engine output torque to the front drive wheels 2a and 2b via the differential 5.

These friction coupling elements 41–46 and one-way clutches 51 and 52 are selectively operated by means of the hydraulically controlled solenoid valves 61 and 62 of the hydraulic control unit 60 so as to place the transmission gear mechanism 30 into desired ranges and gears, i.e. the first (1st) to fourth (4th) gears in the drive (D) range, the first (1st) to third (3rd) gears in the second speed (S) range, the first (1st) and second (2nd) gears in the low speed (L) range, the park (P) range and the neutral (N) range, as shown in Table I in which a circle indicates that each specific element is coupled or locked.

TABLE I

| Range / Gear | | CLUTCH | | | BRAKE | | ONE-WAY CLUTCH | |
|---|---|---|---|---|---|---|---|---|
| | | FWD | CST | 3/4 | RVS | 2/4 | LRV | 1ST | 2ND |
| Park (P) | | | | | | | | | |
| Reverse (R) | | | | | ○ | | ○ | | |
| Neutral (N) | | | | | | | | | |
| Drive (D) | 1st | ○ | | | | | | ○ | ○ |
| | 2nd | ○ | | | | ○ | | ○ | |
| | 3rd | ○ | ○ | ○ | | | | ○ | |
| | 4th | ○ | | ○ | | ○ | | | |
| Second (S) | 1st | ○ | | | | | | ○ | ○ |
| | 2nd | ○ | ○ | | | ○ | | ○ | |
| | 3rd | ○ | ○ | ○ | | | | ○ | |
| Low (L) | 1st | ○ | ○ | | | | ○ | ○ | ○ |
| | 2nd | ○ | ○ | | | ○ | | ○ | |

Figure 3:
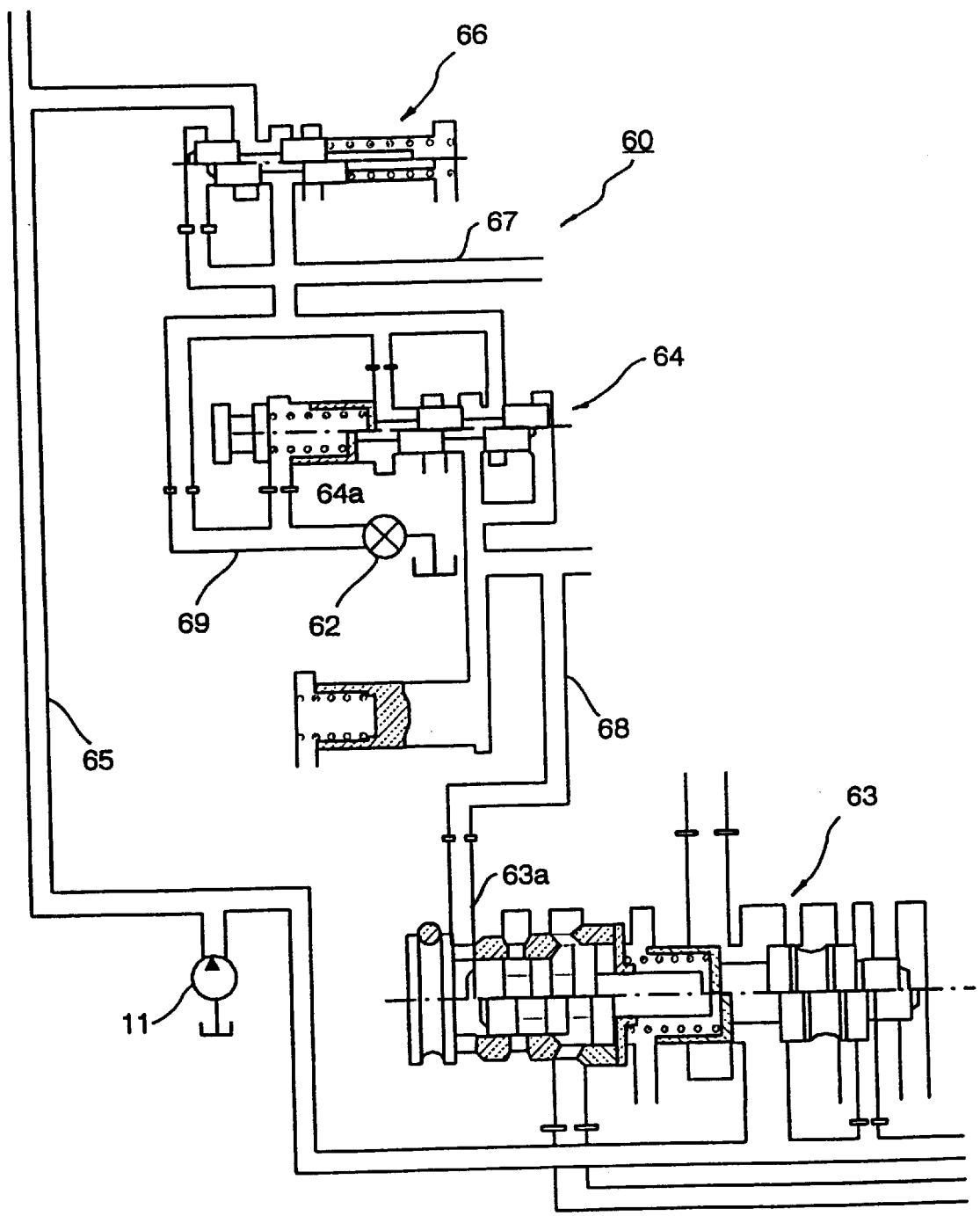
FIG. 3 is a hydraulic circuit of the hydraulic control system.

Referring to FIG. 3, the hydraulic circuit of the hydraulic control unit 60, shown partly, has valves, such as a regulator valve 63 for regulating oil discharged by the oil pump 11 to a predetermined line pressure, a modulator valve 64 for providing for the regulator valve 63 a control pressure and a reducing valve 66 for reducing hydraulic pressure to a specified level of pressure. Hydraulic pressure is supplied by the oil pump 11 to the reducing valve 66 through a main pressure line 65 and, after reduced to a specified level, to the modulator valve 64 through a pressure line 67. The control pressure is supplied by the modulator valve 64 to the regulator valve 63 at its intensifying port 63a through a control pressure line 68. Further, pilot pressure is supplied to the modulator valve 64 at its control port 64a through a pilot pressure line 69 branching off from the pressure line 67. The duty solenoid valve 62 is installed in the pilot pressure line 69 so as to develop a pilot pressure according to its duty rate at the control port 64a of the modulator valve 64. The hydraulic pressure at the specified level is regulated by the modulator valve according to the pilot pressure, i.e. the duty rate of the duty solenoid valve 62 and directed as a control pressure to the regulator valve 63. With the hydraulic circuit thus structured, the regulator valve 63 develops a line pressure regulated according to the duty rate of the duty solenoid valve 62.

In order for the automatic transmission 4 to achieve a gear shift over an intended or target shifting time, the control unit 70 controls the duty rate of the duty solenoid valve 62 according to an input torque to the transmission gear mechanism 30, the force of inertia of the power transfer line to the transmission gear mechanism 30, which is represented by a change in turbine speed, and the kinetic friction coefficient of a friction coupling element which is coupled or uncoupled during the specific gear shift so that the regulator valve 63 develops a desired line pressure in the hydraulic control unit 60.

Figure 4:
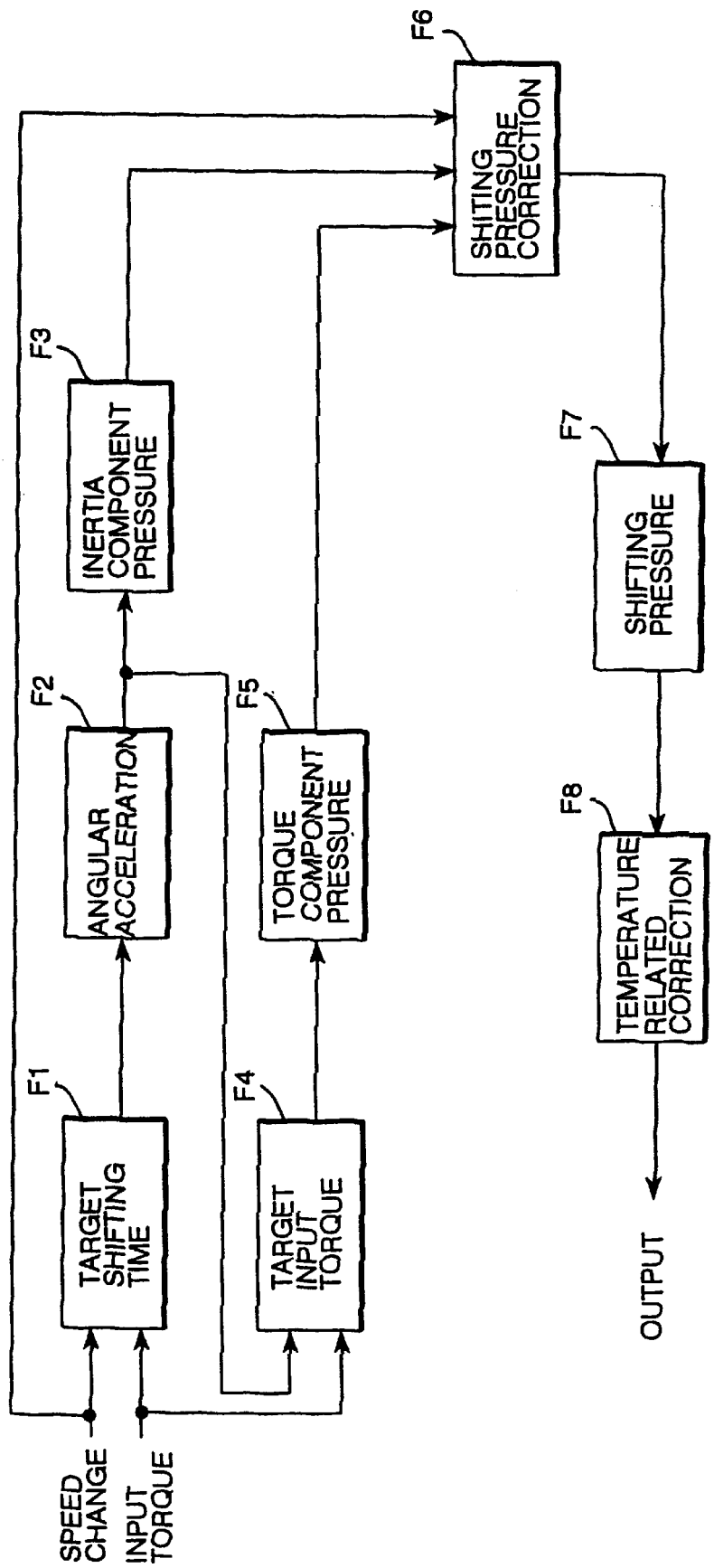
FIG. 4 is a block diagram of a shifting pressure control.

FIG. 4 is a block diagram illustrating a conceptualized principle of the line pressure control which the control unit performs. At a functional block F1, a target shifting time is determined based on a change in rotational speed of the transmission gear mechanism 30, i.e. a change in turbine speed, between before and after a gear shift (which is hereafter referred to as a speed change for simplicity), and an input torque to the transmission gear mechanism 30, i.e. a torque of the turbine shaft 27 (which is hereafter referred to as an input torque for simplicity). The input torque is calculated in an ordinary way well known in the art based on engine load or throttle position, engine speed, ignition timing on condition that there occurs no torque drop during a gear shift.

While, as the shifting time becomes short, the vehicle responds fast and satisfactorily to gear shifting, improving the quality of driving during the gear shift, nevertheless, there occurs during up-shifting such a phenomenon that the transmission gear mechanism 30 causes a momentary rise in output torque due to the force of inertia of the power transfer line to the transmission gear mechanism 30 and the torque rise is enhanced with a reduction in the shifting time. Because a massive torque rise is apt to produce a shift shock, it is always imprudent and undesirable to shorten the shifting time excessively. Contrarily, a prolonged shifting time causes aggravation of the responsiveness of the vehicle to the gear shifting or the quality of driving of the vehicle. Accordingly, it is typical to establish a target shifting time according to driving conditions so as to be best for preventing an occurrence of a substantial shift shock and providing the intended quality of driving. Target shifting times are mapped with speed change and input torque as parameters and stored in a memory of the control unit 70.

Subsequently, at a function block F2, angular acceleration of the transmission gear mechanism 30 at the input side (which is hereafter referred to as input angular acceleration for simplicity) is calculated by dividing a speed change by the shifting time. As well known in the art, letting the moment of inertia of the power transfer line to the transmission gear mechanism 30 be I, the moment of force N of the power transfer line, i.e. the force of inertia to the friction coupling element related the gear shift during shifting is given by the following equation:

$$N = I \cdot \omega'$$

Since the moment of inertia I is invariable, the force of inertia N is proportional to and determined unconditionally based only the angular acceleration $\omega'$. At functional block F3, an inertia component pressure Tci necessary to absorb the force of inertia N caused due to the moment of inertia I of the power transfer line to the transmission gear mechanism 30 is determined.

As was previously described, since the force of inertia caused due to the moment of inertia I of the power transfer line to the transmission gear mechanism 30 acts on the friction coupling element during shifting, a coupling pressure, i.e. a line pressure, necessary to couple the friction coupling element related to the gear shift must be regulated according to the force of inertia. The inertia component pressure Tci is determined based on the angular acceleration $\omega'$ to which the force of inertia N is proportional. In this instance, an inertia component pressure Tci is previously given in a table with angular acceleration as a parameter and stored in a memory of the control unit 70.

At function block F4, simultaneously with the determination of an inertia component pressure Tci, a target input torque transferred to the transmission gear mechanism 30 is calculated in the case where a gear shift is performed on condition that the torque drop control is induced. The torque drop control is performed to cause a drop or fall in engine output torque during shifting in order to prevent a momentary rise in transmission output torque caused by the force of inertia, which acts on the transmission gear mechanism 30 in the same direction as the input torque, due to the moment of inertia I of the power transfer line to the transmission gear mechanism 30. Target input torque are mapped with angular acceleration and input torque as parameters and stored in a memory of the control unit 70. At function block F5, a torque component pressure Tct, which is necessary to develop a coupling force in conformity with an input torque to the transmission gear mechanism 30, is subsequently determined based on the target input torque which has been determined in consideration of a torque drop. Torque component pressure Tct are mapped according to target input pressure as a parameter and stored in a memory of the control unit 70. Based on these inertia component pressure Tci, torque component pressure Tct, speed change in rotation of the friction coupling element related to a specific gear shift, the friction coefficient $\mu$ of the friction coupling element related to the gear shift is corrected at function block F6. This friction coefficient $\mu$ is used to determine a shifting pressure necessary to cause the gear shift at function block F7. More specifically describing, the friction coefficient $\mu$ is estimated based on both, or otherwise either one, of an interfacial pressure between drive and driven clutch plates of the friction coupling element in an axial direction and a relative speed between them. Finally, the shifting pressure is further corrected as an eventual target line pressure is established according to the temperature of oil of the transmission at function F8. With the line pressure control, a target line pressure is set according to the friction coefficient $\mu$ of a friction coupling element to which the pressure is applied, so as to cause a gear shift over an exact target shifting time.

While the shifting pressure is set or calculated after and based on the estimation of the friction coefficient $\mu$, a calculation may be made based on the input torque and the angular acceleration to obtain the shifting pressure which has been tempered with the effect of friction.

Since the interfacial pressure is proportional to the shifting pressure P, and the relative speed can be substituted by angular acceleration $\omega'$, the friction coefficient $\mu$ is given by the following function of independent variables P and $\omega'$ (2):

$$\mu = g(P, \omega') \quad (2)$$

The force of friction ($\mu \cdot A \cdot P$) acting on the friction coupling element is given by the following function of independent variables, such as an input torque Tt and angular acceleration $\omega'$ (3):

$$\mu \cdot A \cdot P = h(Tt, \omega') \quad (3)$$

where A is the area of surface of clutch plates of the friction coupling element.

From functions (2) and (3), $$g(P, \omega') \cdot A \cdot P = h(Tt, \omega') \quad (4)$$

Since independent variables in the function (4) are P, Tt and $\omega'$, the following function (5) is theoretically derived from the function (6):

$$P = f(Tt, \omega') \quad (5)$$

However, since it is generally impossible to derive the function (5) from the function (6) by algebraic transformation, the shifting pressure P is approximated by a Maclaurin expansion polynomial including independent variables, such as an input torque Tt and angular acceleration $\omega'$.

The shifting pressure P may be given by a first order approximation polynomial.

$$P = a_1 \cdot Tt + a_2 \cdot \omega' + a_3 \cdot Tt \cdot \omega' + a_4 \quad (6)$$

In the equation (6), $a_1$–$a_4$ are constants determined according to the friction coefficient $\mu$ of the friction coupling element and obtained experimentally and analytically.

Alternatively, the shifting pressure P may be given by a second order approximation polynomial.

$$P = b_1 \cdot Tt + b_2 \cdot \omega' + b_3 \cdot Tt \cdot \omega' + b_4 \cdot Tt^2 + b_5 \cdot \omega'^2 + b_6 \cdot Tt^2 \cdot \omega' + b_7 \cdot Tt \cdot \omega'^2 + b_8 \cdot Tt^2 \cdot \omega'^2 + b_9 \quad (7)$$

In the equations (6) and (7), $a_1$–$a_4$ and $b_1$–$b_9$ are constants which are experimentally and analytically determined according to the friction coefficient $\mu$ of the friction coupling element.

From the results of experiments and analyses conducted by the inventors, it concluded that the second order approximation polynomial may be practically simplified and expressed as follows:

$$P = c_1 \cdot Tt + c_2 \cdot \omega' + c_3 \cdot Tt \cdot Tt + c_4 \quad (8)$$

In the equation (8), $c_1$–$c_8$ are constants which are experimentally and analytically determined according to the friction coefficient $\mu$ of the friction coupling element.

If the equation (8) is proper, by determining the constants $c_1$–$c_4$ based on a plurality of measurements of these shifting pressure P, input torque Tt and angular acceleration $\omega'$ experimentally obtained in the event of a gear shift achieved over a target shifting time, the shifting pressure P which is tempered with the effect of friction according to an input torque Tt and angular acceleration $\omega'$ is known from the equation (8). Accordingly, if keeping the line pressure at the shifting pressure P, the gear shift is caused over the target shifting time.

Figure 10:
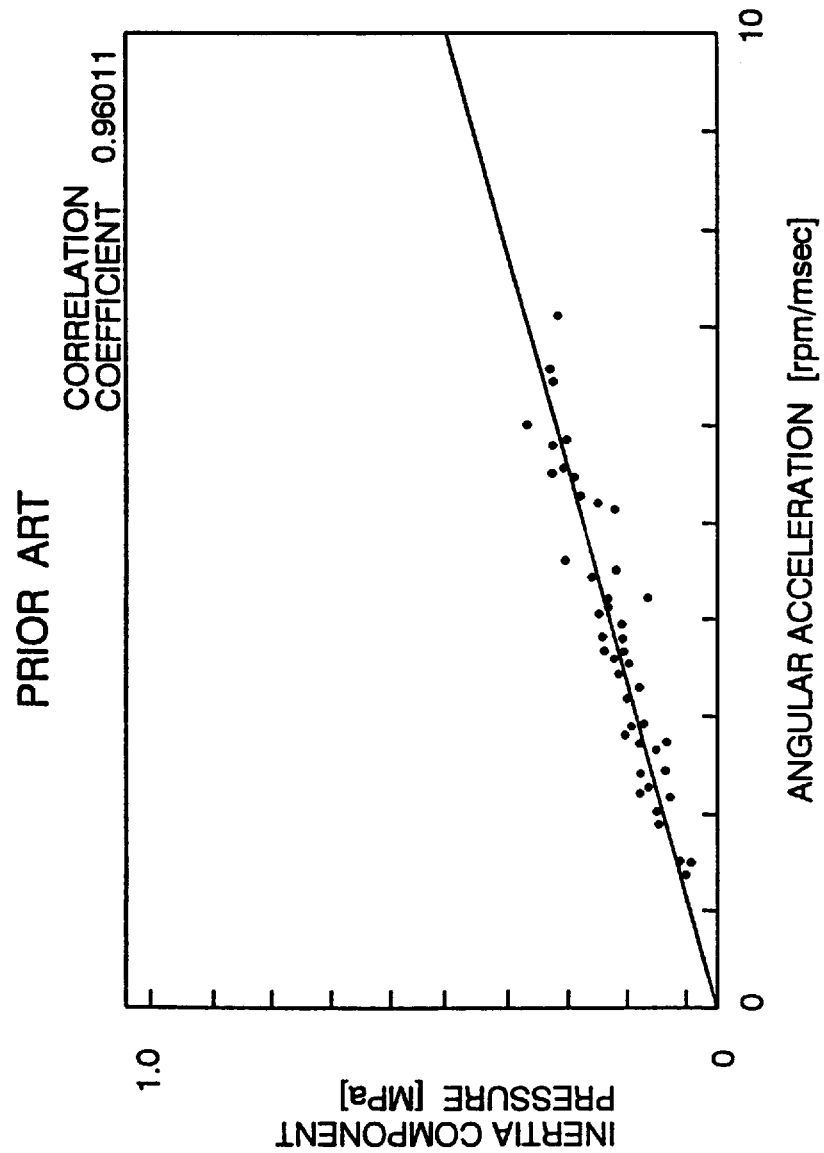
FIG. 10 is a diagram showing the correlation between inertia component pressure and angular acceleration for the prior art pressure control system.
Figure 11:
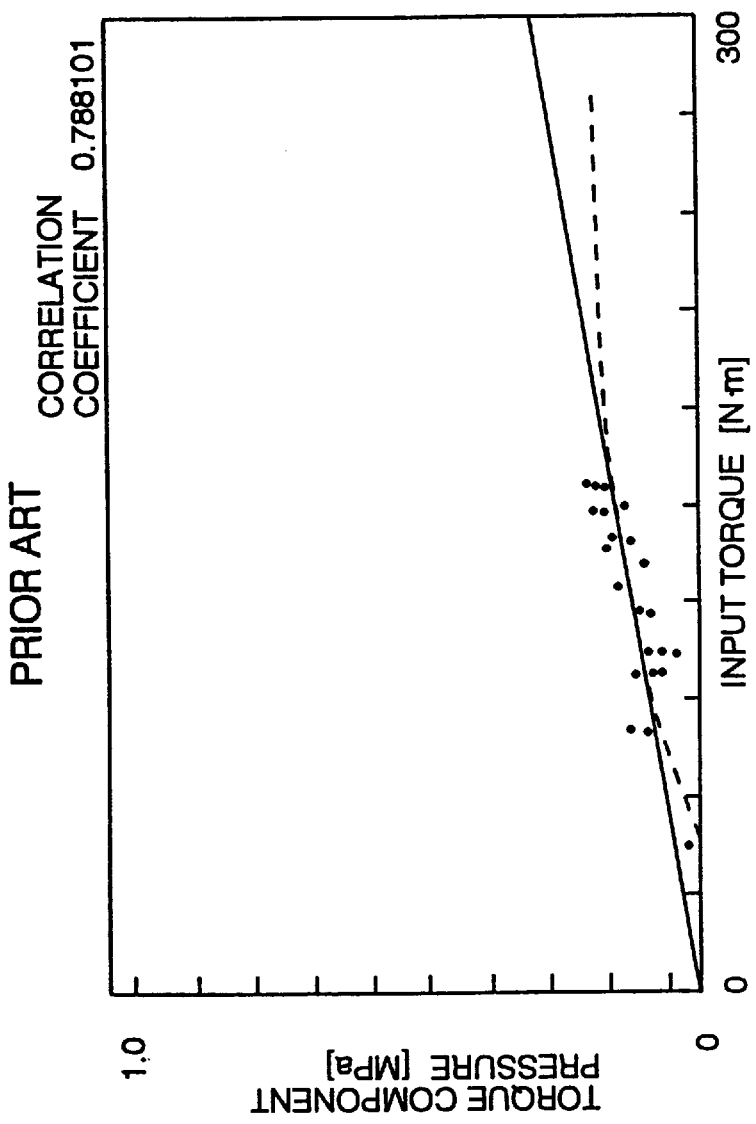
FIG. 11 is a diagram showing the correlation between torque component pressure and input torque for the prior art pressure control system.

In view of the above analysis, the constants $c_1$–$c_4$, such as leading to minimum errors, were determined by a multiple regression analysis of the actual measurements of input torque Tt and angular acceleration $\omega'$ which are plotted in FIGS. 10 and 11. Here, if the equation (8) is proper, the component pressure of the shifting pressure P must be proportional to the respective related factors, i.e. angular acceleration $\omega'$, an input torque Tt and a square input torque $Tt^2$, respectively, and consequently, the correlation between each component pressure and the related factor must be linear.

Figure 7:
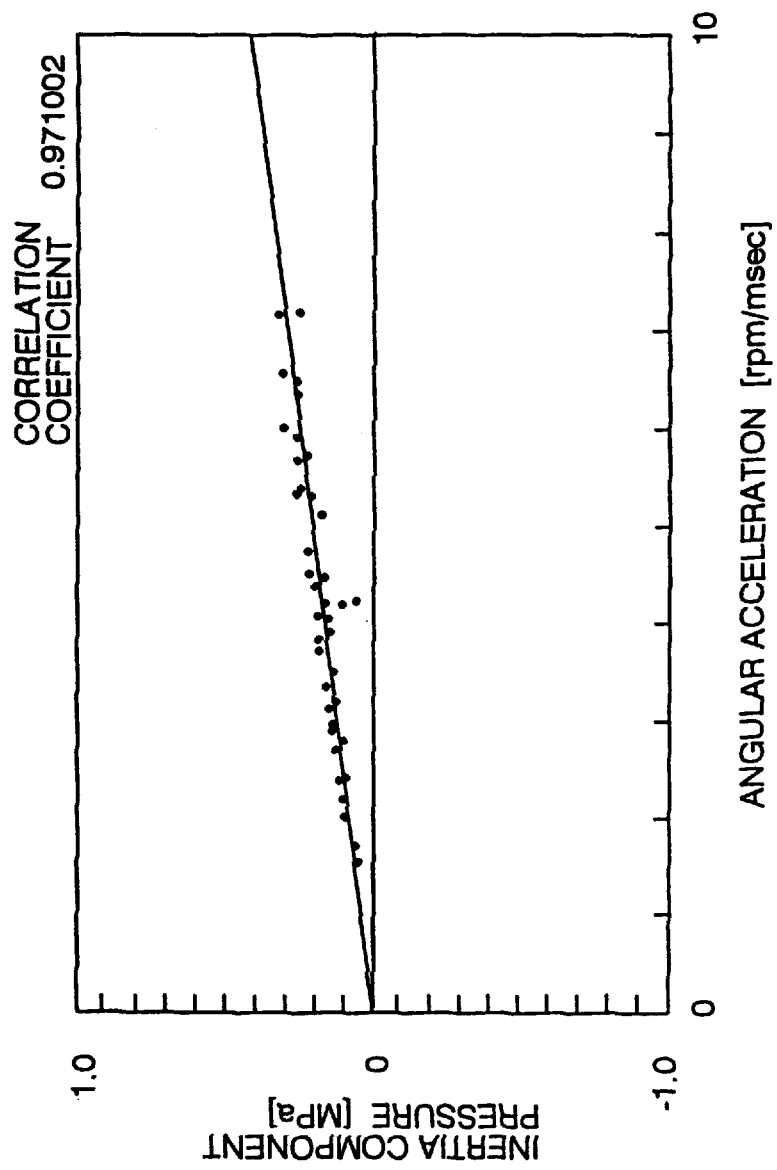
FIG. 7 is a diagram showing the correlation between inertia component pressure and angular acceleration.
Figure 8:
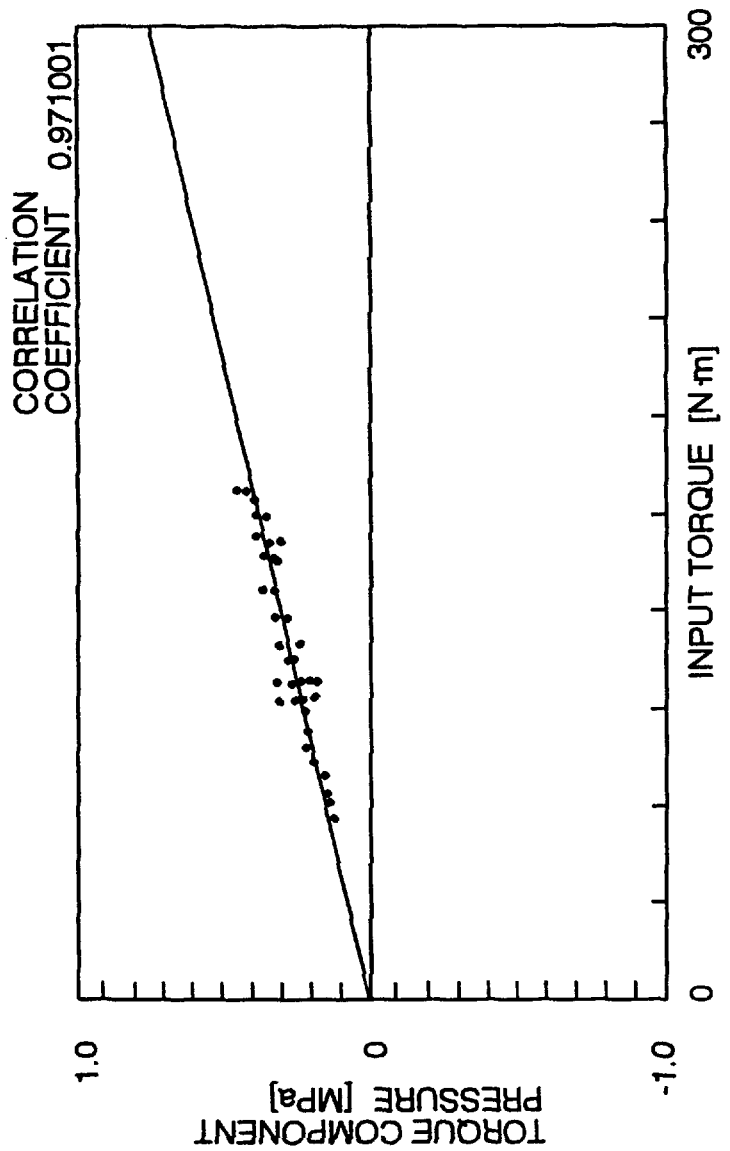
FIG. 8 is a diagram showing the correlation between torque component pressure and input torque.
Figure 9:
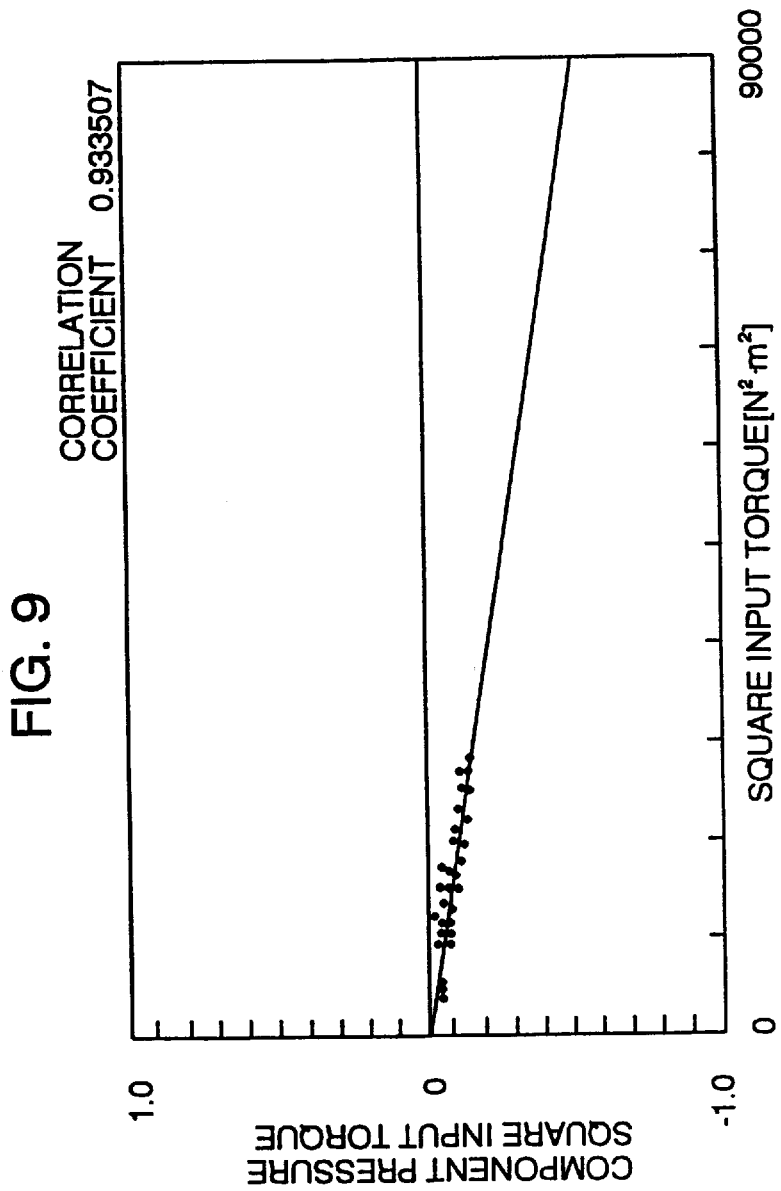
FIG. 9 is a diagram showing the correlation between pressure and square value input torque.

The correlations of the component pressure to the respective factors having been obtained based on the actual measurements of an input torque Tt and angular acceleration $\omega'$ are shown in FIGS. 7–9. As apparent from these figures, these correlations have coefficients of 0.971002, 0.971001 and 0.933570, respectively, which are sufficiently large to be regarded as linear. Accordingly, it is proved that the equation (8) provides a target shifting pressure considerably accurate for achieving a gear shift over a target shifting time.

In the line pressure control, a target line pressure such as having been tempered with the effect of friction of a friction coupling element relating to a specific gear shift is determined without actually finding the friction coefficient of the friction coupling element, enabling the gear shift to be achieved over a target shifting time.

Figure 5:
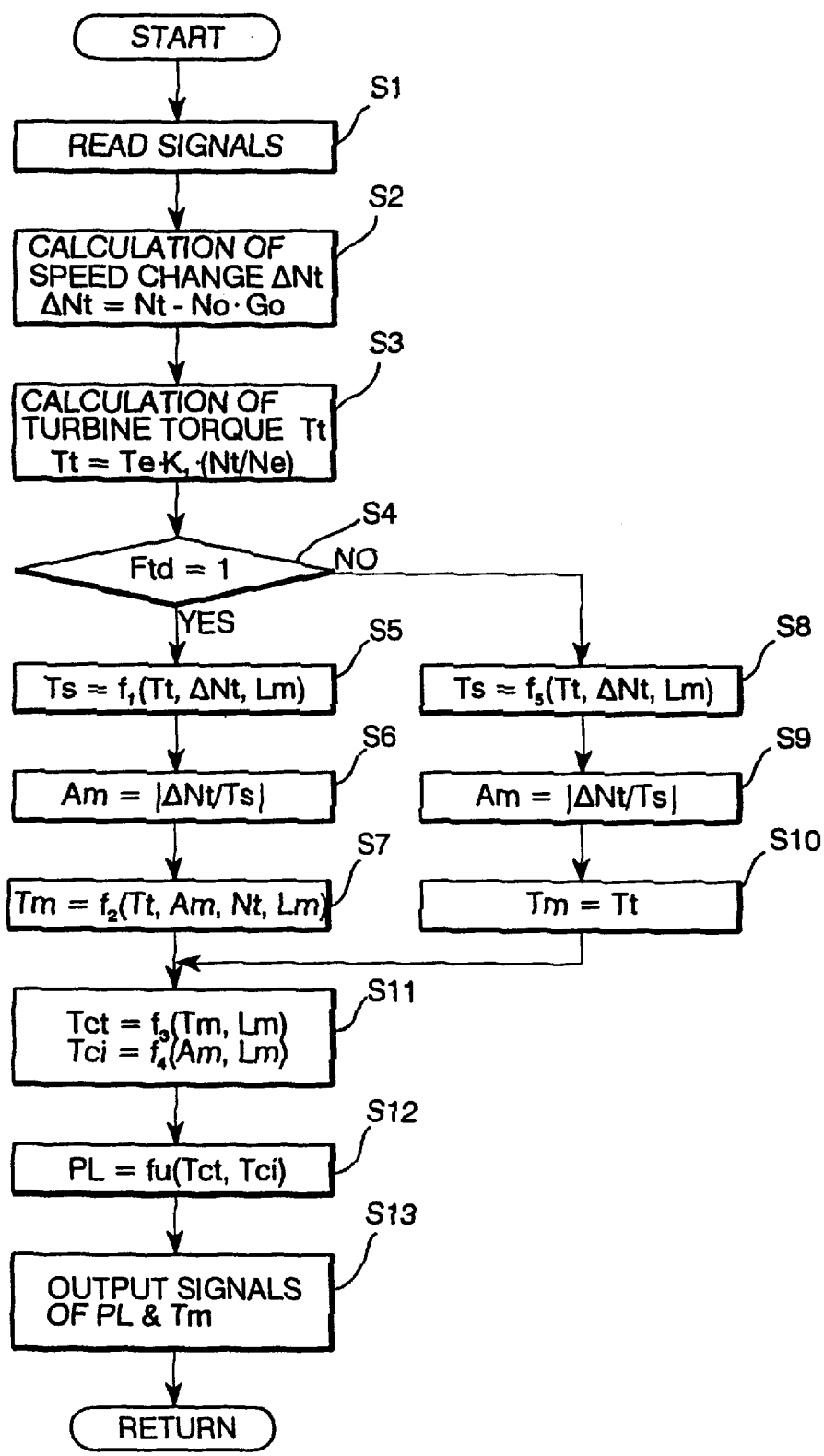
FIG. 5 is a flow chart illustrating a shifting pressure control sequence routine.

Referring to FIG. 5, which is a flow chart of a line pressure control sequence routine which the control unit 70 performs during, for instance, a schedule-up gear shift taking place upon an occurrence of a rise in vehicle speed, when a schedule-up gear shift commences and control proceeds to step S1 where various signals provided by the sensors 71–79 are read. At step S2, a prospective turbine speed change $\Delta Nt$, which refers to a prospective change in rotational speed Nt of the turbine 23 between before and after the gear shift, is calculated according to the following equation (9):

$$\Delta Nt = Nt - No \cdot Go \quad (9)$$

where

No is the output rotational speed of the transmission gear mechanism 30; and

Go is the gear ratio after gear shift.

Subsequently, a calculation is made at step S3 to determine a turbine torque Tt according to the following equation (10):

$$Tt = Te \cdot K_1 \cdot (Nt/Ne) \quad (10)$$

where

Te is the engine output torque;

$K_1$ is the coefficient of torque multiplication of the torque convertor 20; and Ne is the rotational speed of the engine 3.

The engine torque Te is determined based on engine speed, the amount of intake air and an ignition time in a manner well known to those skilled in the art.

After the calculations of these prospective turbine speed change $\Delta Nt$ and turbine torque Tt, a decision is made at step S4 as to whether a torque down flag Ftd is up or set to a state of "1" which indicates that the torque down control is permitted. The torque down control takes place when, for instance, the engine temperature sensor 75 detects temperatures of the engine 3 which indicate warming up of the engine 3. If the answer to the decision is "YES," a torque down shifting time map $f_1$, which defines shifting times with parameters such as turbine torque Tt, prospective turbine speed changes $\Delta Nt$ and types of gear shifts Lm, is searched to find a target shifting time Ts for a gear shift during torque down control at step S5. Subsequently, at step S6, a target angular acceleration Am is given by a calculation according to the following equation (11):

$$Am = |\Delta Nt/Ts| \tag{11}$$

Then, at step S7, a target turbine torque map $f_2$, which defines target turbine torque with parameters such as turbine torque Tt, turbine speed Nt and angular acceleration Am, is searched to find a target turbine torque Tm.

On the other hand, if the answer to the decision concerning the torque down flag Ftd made at step S4 is "NO," this indicates that the torque down control is prohibited, then, after finding a target shifting time Ts by searching a torque down shifting time map $f_5$ for non-torque down control at step S8 and, subsequently, calculating a target angular acceleration Am according to the following equation (11) at step S9, the turbine torque Tt is set as a target turbine torque Tm at step S10. In this instance, the target shifting time Ts for a specific gear shift is predetermined to be longer in the non-torque down shifting time map $f_5$ than in the torque down shifting time map $f_1$.

After the determination of a target turbine torque Tm either at step S7 or at step S10, a torque component pressure Tct and an inertia component pressure Tci are found by searching a torque component pressure map $f_3$ and an inertia component pressure map $f_4$, respectively, at step S11. As was described previously, the torque component pressure Tct used herein refers to a pressure necessary to generate a coupling force of a friction coupling element corresponding to an input torque to the transmission gear mechanism 30 and the inertia component pressure Tci used herein refers to a pressure necessary to absorb the force of inertia N caused due to the moment of inertia I of the power transfer line to the transmission gear mechanism 30. The torque component pressure map $f_3$ defines torque component pressure Tct according to target turbine torque Tm and types of gear shifts Lm as parameters. Similarly, the inertia component pressure map $f_4$ defines inertia component pressure Tci according to target angular acceleration Am and types of gear shifts Lm as parameters.

At step S12, a target line pressure PL is found by searching a target line pressure map $f_u$ according to a torque component pressure Tct and an inertia component pressure Tci as parameters. The target line pressure map $f_u$ is given experimentally and analytically as a function after consideration of the friction coefficient of the friction coupling element related to a specific gear shift. As was described previously, because, though the friction coefficient is basically determined according to an interfacial pressure and a relative speed between the clutch plates of a friction coupling element, the interfacial pressure is given as a function of a torque component pressure and a function of an inertia component pressure Tct and the relative speed is given as a function of inertia component pressure Tci, the target line pressure which has been tempered with the effect of friction is given as a function of these inertia component pressure Tct and inertia component pressure Tci as independent variables.

Finally, at step S13, control signals are provided to control the line pressure so as to develop the target line pressure PL and the engine output torque by regulating an ignition time so as to provide for the turbine the target turbine torque Tm.

The line pressure control may be changed so as to determine target line pressure PL according to a preliminary target line pressure Pa.

Figure 6:
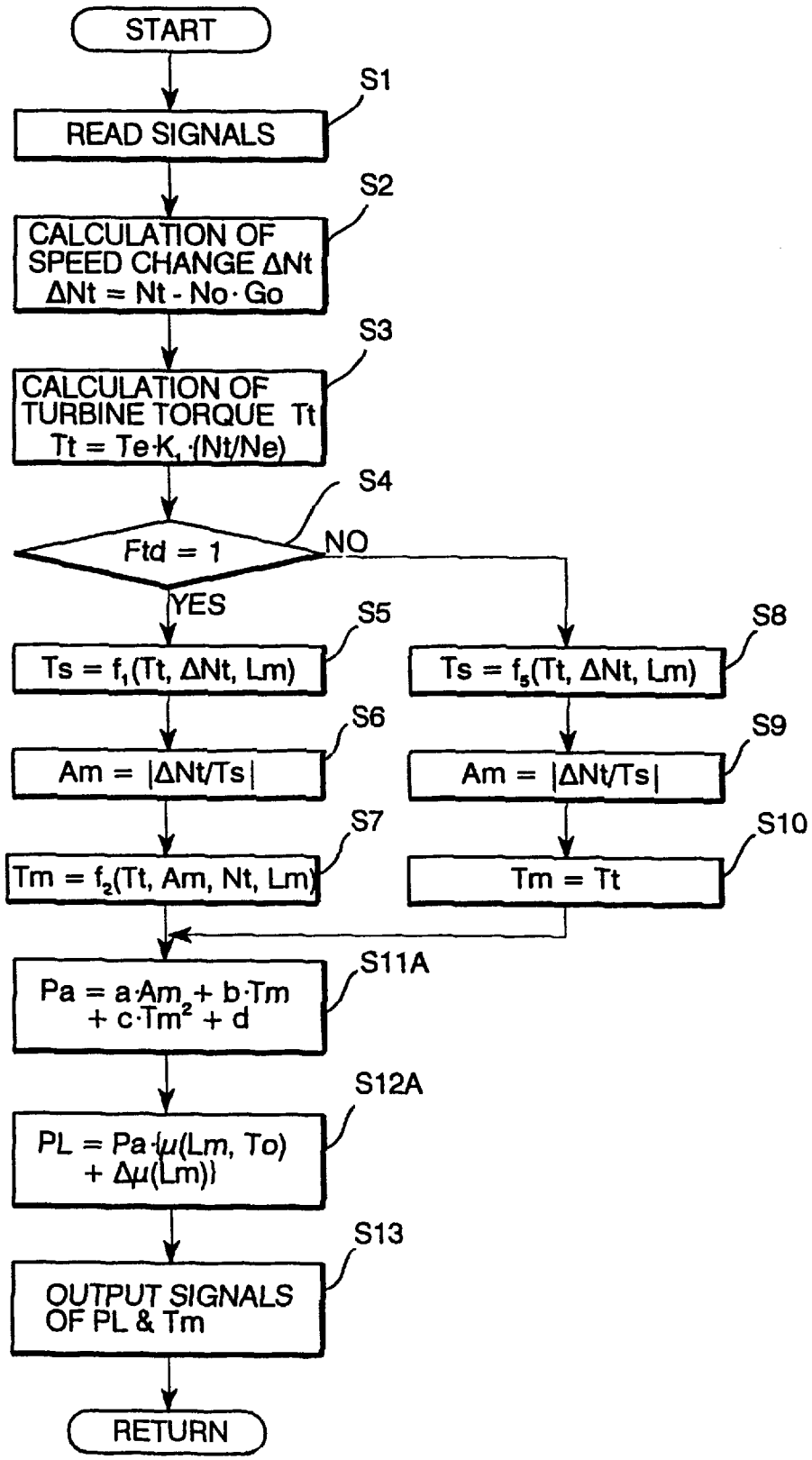
FIG. 6 is a flow chart illustrating a variation of the shifting pressure control sequence routine.

FIG. 6 is a flow chart of another line pressure control sequence routine which the control unit 70 performs during, for instance, a schedule-up gear shift taking place upon an occurrence of a rise in vehicle speed. This line pressure control sequence routine takes just the same steps S1–S10 as the previous sequence routine shown in FIG. 5 in order to calculate the target turbine torque Tm. In the line pressure control sequence routine, the preliminary target line pressure Pa is given by the following equation (12):

$$Pa = a \cdot Am + b \cdot Tm + c \cdot Tm^2 + d \tag{12}$$

In the equation (12), a–d are constants which are experimentally and analytically determined according to the friction coefficient $\mu$ of the friction coupling element. The equation (12) is a second order approximation polynomial simplified and basically similar to the equation (8), in which target angular acceleration Am and target turbine torque Tm are substituted for the angular acceleration $\omega'$ and input torque Tt in the equation (8), respectively.

After the determination of a target turbine torque Tm either at step S7 or at step S10, a preliminary target line pressure Pa is calculated at step S11A. Subsequently, at step S12A, an eventual target line pressure PL is obtained by performing a correction of the preliminary target line pressure Pa according to the friction coefficient of the friction coupling element and a change of the friction coefficient due to types of gear shifts. The eventual target line pressure PL is corrected by the following equation (13):

$$PL = Pa \cdot \{\mu(Lm, To) + \Delta\mu(Lm)\} \tag{12}$$

The friction coefficient $\mu$ is defined in a map according to the type of gear shift Lm and the temperature To of oil as parameters. The change $\Delta\mu$ in the friction coefficient is defined in a map according to the type of gear shift Lm and determined by learning. The correction of the preliminary target line pressure Pa is made on one hand to compensate the line pressure for a change in viscosity of the oil due to temperature changes and, on the other hand, to cope with a change in characteristics of the hydraulic control unit 60 due to aging.

At step S13, control signals are provided to control the line pressure so as to develop the target line pressure PL and the engine output torque by regulating an ignition time so as to provide for the turbine the target turbine torque Tm.

With the line pressure control according to the above described embodiments of the present invention, a friction coupling element is brought into friction coupling with the line pressure having been tempered with the effect of friction of the friction coupling element, achieving a gear shift accurately over the target shifting time.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A hydraulic control system for an automatic transmission which includes hydraulically controlled friction coupling elements selectively coupled and uncoupled so as to change power transfer lines of the automatic transmission, thereby shifting the automatic transmission into desired gears, said hydraulic control system comprising:

hydraulic circuit means for supplying a shifting pressure necessary for a friction coupling element to be brought into coupling so as to cause a gear shift of said automatic transmission to a specific gear;

means for presuming a friction coefficient of said friction coupling element during said gear shift on the basis of values relating to input torque to the automatic transmission and angular acceleration of transmission input shaft; and pressure control means for controlling said shifting pressure according to said friction coefficient of said friction coupling element.

2. A hydraulic control system as defined in claim 1, wherein said friction coupling element comprises drive and driven plates and said means for presuming presumes said friction coefficient based on at least one of an interfacial pressure between said drive and driven plates and a relative speed between said drive and driven plates.

3. A hydraulic control system as defined in claim 1, and further comprising speed sensor means for detecting an input speed change in rotation of said automatic transmission and means for determining an input torque to said automatic transmission, wherein said pressure control means determines said shifting pressure according to a function including said speed change and said input torque as independent variables defined by a first order approximate functional equation.

4. A hydraulic control system as defined in claim 3, wherein said shifting pressure P is given by the following first order approximate functional equation:

$$P = a_1 \cdot Tt + a_2 \cdot \omega' + a_3 \cdot Tt \cdot \omega' + a_4$$

where

Tt is an input torque to said automatic transmission;

$\omega'$ is an angular acceleration of the input shaft of said automatic transmission; and $a_1$–$a_4$ are constants depending upon a friction coefficient of said friction coupling element.

5. A hydraulic control system as defined in claim 1, and further comprising speed sensor means for detecting an input speed change in rotation of said automatic transmission and means for determining an input torque to said automatic transmission, wherein said pressure control means determines said shifting pressure according to a function including said speed change and said input torque as independent variables defined by a second order approximate functional equation.

6. A hydraulic control system as defined in claim 5, wherein said shifting pressure P is given by the following second order approximate functional equation:

$$P = b_1 \cdot Tt + b_2 \cdot \omega' + b_3 \cdot Tt \cdot \omega' + b_4 \cdot Tt^2 + b_5 \cdot \omega'^2 + b_6 \cdot Tt^2 \cdot \omega' + b_7 \cdot Tt \cdot \omega'^2 + b_8 \cdot Tt^2 \cdot \omega'^2 + b_9$$

where

Tt is an input torque to said automatic transmission;

$\omega'$ is an angular acceleration of the input shaft of said automatic transmission; and $b_1$–$b_9$ are constants depending upon a friction coefficient of said friction coupling element.

7. A hydraulic control system as defined in claim 2, and further comprising speed sensor means for detecting an input speed change in rotation of said automatic transmission and means for determining an input torque to said automatic transmission, wherein said pressure control means determines said shifting pressure according to a function including said speed change and said input torque as independent variables defined by a first order approximate functional equation.

8. A hydraulic control system as defined in claim 7, wherein said shifting pressure P is given by the following first order approximate functional equation:

$$P = a_1 \cdot Tt + a_2 \cdot \omega' + a_3 \cdot Tt \cdot \omega' + a_4$$

where

Tt is an input torque to said automatic transmission;

$\omega'$ is an angular acceleration of the input shaft of said automatic transmission; and $a_1$–$a_4$ are constants depending upon a friction coefficient of said friction coupling element.

9. A hydraulic control system as defined in claim 2, and further comprising speed sensor means for detecting an input speed change in rotation of said automatic transmission and means for determining an input torque to said automatic transmission, wherein said pressure control means determines said shifting pressure according to a function including said speed change and said input torque as independent variables defined by a second order approximate functional equation.

10. A hydraulic control system as defined in claim 9, wherein said shifting pressure P is given by the following second order approximate functional equation:

$$P = b_1 \cdot Tt + b_2 \cdot \omega' + b_3 \cdot Tt \cdot \omega' + b_4 \cdot Tt^2 + b_5 \cdot \omega'^2 + b_6 \cdot Tt^2 \cdot \omega' + b_7 \cdot Tt \cdot \omega'^2 + b_8 \cdot Tt^2 \cdot \omega'^2 + b_9$$

where

Tt is an input torque to said automatic transmission;

$\omega'$ is an angular acceleration of the input shaft of said automatic transmission; and $b_1$–$b_9$ are constants depending upon a friction coefficient of said friction coupling element.

11. A hydraulic control system as defined in claim 1, and further comprising means for determining an input torque to said automatic transmission, wherein said pressure control means determines said shifting pressure according further to said input torque.

12. A hydraulic control system as defined in claim 1, and further comprising means for determining an inertia of said power transfer line during said gear shift, wherein said pressure control means determines said shifting pressure according further to said inertia.

13. A hydraulic control system for an automatic transmission consisting of a torque convertor and a transmission gear mechanism which includes hydraulically controlled friction coupling elements selectively coupled and uncoupled by a hydraulic control circuit so as to change power transfer lines of the transmission gear mechanism, thereby shifting the automatic transmission into desired gears, said hydraulic control system comprising:

speed sensor means for detecting a speed change in rotation of said transmission gear mechanism;

means for determining an input torque to said transmission gear mechanism; and pressure determining means for presuming a friction coefficient of a friction coupling element, which is brought into coupling to shift said automatic transmission into a specific gear, during a shift to said specific gear and determining a shifting pressure necessary for said friction coupling element to be brought into coupling so as to achieve said shift over a predetermined shifting time according to said input torque to said transmission gear mechanism, said speed change of said transmission gear mechanism and said friction coefficient of said friction coupling element.

14. A hydraulic control system as defined in claim 13, wherein said friction coupling element comprises drive and driven plates and said pressure determining means presumes said friction coefficient based on at least one of an interfacial pressure between said drive and driven plates and a relative speed between said drive and driven plates.

15. A hydraulic control system as defined in claim 14, and further comprising speed sensor means for detecting an input speed change in rotation of said automatic transmission, wherein said pressure control means determines said shifting pressure according to a function including said speed change and said input torque as independent variables defined by a first order approximate functional equation.

16. A hydraulic control system as defined in claim 15, wherein said shifting pressure P is given by the following first order approximate functional equation:

$$P = a_1 \cdot Tt + a_2 \cdot \omega' + a_3 \cdot Tt \cdot \omega' + a_4$$

where

Tt is an input torque to said automatic transmission;

$\omega'$ is an angular acceleration of the input shaft of said automatic transmission; and $a_1$–$a_4$ are constants depending upon a friction coefficient of said friction coupling element.

17. A hydraulic control system as defined in claim 14, and further comprising speed sensor means for detecting an input speed change in rotation of said automatic transmission, wherein said pressure control means determines said shifting pressure according to a function including said speed change and said input torque as independent variables defined by a second order approximate functional equation.

18. A hydraulic control system as defined in claim 17, wherein said shifting pressure P is given by the following second order approximate functional equation:

$$P = b_1 \cdot Tt + b_2 \cdot \omega' + b_3 \cdot Tt \cdot \omega' + b_4 \cdot Tt^2 + b_5 \cdot \omega'^2 + b_6 \cdot Tt^2 \cdot \omega' + b_7 \cdot Tt \cdot \omega'^2 + b_8 \cdot Tt^2 \cdot \omega'^2 + b_9$$

where

Tt is an input torque to said automatic transmission;

$\omega'$ is an angular acceleration of the input shaft of said automatic transmission; and $b_1$–$b_9$ are constants depending upon a friction coefficient of said friction coupling element.

\* \* \* \* \*